United States Patent
Kobayashi

(10) Patent No.: US 9,065,110 B2
(45) Date of Patent: Jun. 23, 2015

(54) BATTERY ASSEMBLY

(75) Inventor: Keiichiro Kobayashi, Toyota (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 572 days.

(21) Appl. No.: 12/669,202

(22) PCT Filed: Jul. 17, 2008

(86) PCT No.: PCT/JP2008/062954
§ 371 (c)(1),
(2), (4) Date: Jan. 15, 2010

(87) PCT Pub. No.: WO2009/014070
PCT Pub. Date: Jan. 29, 2009

(65) Prior Publication Data
US 2010/0196751 A1    Aug. 5, 2010

(30) Foreign Application Priority Data

Jul. 23, 2007   (JP) ................................. 2007-191443

(51) Int. Cl.
*H01M 2/10* (2006.01)
*H01M 2/02* (2006.01)

(52) U.S. Cl.
CPC ............ *H01M 2/1077* (2013.01); *H01M 2/024* (2013.01)

(58) Field of Classification Search
USPC ........................................................ 429/176
See application file for complete search history.

(56) References Cited

U.S. PATENT DOCUMENTS

| 6,174,618 B1* | 1/2001 | Nishiyama et al. ............. 429/99 |
| 6,340,877 B1 | 1/2002 | Mita et al. |
| 6,849,357 B1 | 2/2005 | Kasahara et al. |
| 2009/0104516 A1* | 4/2009 | Yoshihara et al. ............ 429/149 |

FOREIGN PATENT DOCUMENTS

| DE | 103 52 046 | 6/2005 |
| JP | 07014601 A * | 1/1995 |
| JP | 2000-173676 | 6/2000 |
| JP | 2001-185103 | 7/2001 |
| JP | 2001-357833 | 12/2001 |
| JP | 2005-52842 | 3/2005 |

(Continued)

OTHER PUBLICATIONS

JP 2000-173676 A, Machine Translation.*

(Continued)

*Primary Examiner* — Barbara Gilliam
*Assistant Examiner* — Robert S Carrico
(74) *Attorney, Agent, or Firm* — Finnegan, Henderson, Farabow, Garrett & Dunner, LLP

(57) ABSTRACT

A battery assembly has circular cylindrical rechargeable/dischargeable battery cells (10) and a holding member for holding the battery cells. On the outer peripheral surface (32) of each battery cell are formed wavy irregularities (34) arranged in the circumferential direction of the battery cell and extending longitudinally. The holding member has battery cell installation holes each having grooves (28) formed in an inner peripheral surface (29) of the installation hole and engaging with the irregularities (34). The battery cells (10) are held inserted in the battery cell installation holes in the holding member, and in this state, the irregularities (34) on the outer peripheral surfaces (32) of the battery cells and the grooves (28) are fitted to each other.

8 Claims, 6 Drawing Sheets

(56) References Cited

FOREIGN PATENT DOCUMENTS

| | | |
|---|---|---|
| JP | 2005-53505 | 3/2005 |
| JP | 2005-78805 | 3/2005 |
| WO | WO 94/11908 | 5/1994 |
| WO | WO 9411908 A1 * | 5/1994 |
| WO | WO 2006126447 A1 * | 11/2006 |

OTHER PUBLICATIONS

IDPL Machine Translation of JP 07014601 A.*
Extended European Search Report for Appl. No. 08778246.2 dated Mar. 19, 2012.

* cited by examiner

BATTERY ASSEMBLY

TECHNICAL FIELD

The present invention relates to a battery assembly, and more particularly to a battery assembly having a plurality of cylindrical battery cells.

This application is a national phase application of International Application No. PCT/JP2008/062954, filed Jul. 17, 2008, and claims priority based on Japanese Patent Application No. 2007-191443, filed on Jul. 23, 2007, the entire contents of both of which are incorporated into this specification by reference.

BACKGROUND ART

Battery assemblies formed by connecting a plurality of battery cells in series, wherein a storage element (physical battery) such as a lithium ion battery, a nickel hydrogen battery, another secondary battery, or a capacitor is used as the battery cell, have grown in importance as power supplies from which high output is obtained, and are used as power supplies installed in vehicles or power supplies for personal computers and portable terminals. A battery assembly formed by connecting in series a plurality of battery cells constituted by lithium ion batteries, which are lightweight and achieve high energy density, can be used particularly favorably as a high output power supply installed in a vehicle.

Incidentally, a cylindrical battery cell may be used as the battery cell in this type of battery assembly. When a cylindrical battery cell is used in the battery assembly, a battery structure in which an external terminal (typically a screw structure) is fastened to one or both ends of the cylindrical battery cell (a cylindrical battery cell case) is known as a representative basic structure thereof. A connecting member (a bus bar, for example) for connecting the battery cells and a fixing member (a so-called holder) for fixing the battery cells are respectively fastened to the external terminal (typically a screw structure). For example, Patent Document 1 discloses an example of a cylindrical battery cell for installation in a vehicle. Further, Patent Document 2 discloses an example of a battery assembly including a plurality of cylindrical battery cells.

When this type of cylindrical battery cell is incorporated into a battery assembly, a rotation stopping mechanism must be provided to prevent fastening torque generated when the external terminal (typically a terminal of a screw structure) is fastened from causing a battery main body (a main body part of the cylindrical battery cell) to rotate together with the external terminal. Conventionally, a fixing mechanism that uses a jig to prevent the battery from rotating is employed as this type of rotation stopping mechanism. Alternatively, a method of providing the battery itself with a rotation stopping function may be employed. More specifically, a mechanism that provides the external terminal and accessories thereof with a rotation stopping function is employed.

Patent Document 1: Japanese Unexamined Patent Application Publication 2005-78805

Patent Document 2: Japanese Unexamined Patent Application Publication 2000-173676

However, with the former rotation stopping mechanism (a fixing mechanism that uses a jig to prevent the battery from rotating), a separate dedicated jig must be designed and manufactured, and moreover, the number of operating steps involved in assembling the battery assembly increases, possibly leading to an increase in cost. Furthermore, space for attaching the jig must be secured in the battery assembly, which may inhibit reductions in the size of the battery assembly. Meanwhile, with the latter rotation stopping mechanism (a mechanism for providing the external terminal and the accessories thereof with a rotation stopping function), increases occur in the number of components and the amount of component processing in direct relation to the process for providing the external terminal and the accessories thereof with a rotation stopping function, which may again lead to an increase in cost. Hence, there is room for improvement in a conventional rotation stopping mechanism in terms of the number of operating steps and the manufacturing cost involved in assembling a battery assembly.

DISCLOSURE OF THE INVENTION

The present invention has been designed in consideration of these points, and a principal object thereof is to provide a battery assembly structured such that unintentional rotation occurring when a cylindrical battery cell is incorporated into a holding member can be prevented, leading to an improvement in the efficiency of an assembly operation.

A battery assembly provided by the present invention is a battery assembly formed by electrically connecting a plurality of rechargeable/dischargeable battery cells.

The battery assembly according to the present invention includes a plurality of cylindrical battery cells and a holding member for holding the plurality of cylindrical battery cells. An outer peripheral surface of the cylindrical battery cell is formed with irregularities that are arranged in a circumferential direction of the cylindrical battery cell and extend in a ridge form in a battery longitudinal (lengthwise) direction. Further, the holding member includes a plurality of battery installation holes (more specifically, installation holes having an opening of substantially the same size as the diameter of the battery cell including the outer peripheral surface irregularities), each of which has groove portions (i.e. irregularities) formed in an inner peripheral surface thereof so as to mesh with the irregularities formed on the battery cell outer peripheral surface. Here, each of the plurality of cylindrical battery cells is held inserted into the battery installation holes in the holding member such that in this state, the irregularities on the battery cell outer peripheral surface and the groove portions in the battery installation holes are fitted to each other (the shapes of the irregularities and the groove portions are aligned with each other such that the two components mesh).

Note that in this specification, the term "battery cell" denotes individual storage elements that can be connected to each other in series to form a battery assembly, and unless otherwise indicated, includes batteries and capacitors having various compositions. Further, the term "secondary battery" typically denotes a battery that can be charged repeatedly, and includes so-called accumulators such as a lithium ion battery and a nickel hydrogen battery.

A storage element constituting a lithium ion battery is a typical example of the "battery cell" disclosed herein, and a lithium ion battery module (also known as a battery pack) formed from a plurality of these battery cells is a typical example of the "battery assembly" disclosed herein.

According to the battery assembly having this constitution, circumferential direction rotation of the cylindrical battery cell can be restricted. More specifically, by providing the irregularities on the outer peripheral surface of the cylindrical battery cell so as to extend in a predetermined ridge form in the longitudinal direction, providing the battery installation holes in the inner peripheral surface of the holding member so as to correspond to the irregularities, and incorporating the battery cell into the holding member by aligning the irregularities and battery installation holes, the cylindrical battery cell can be prevented from rotating relative to the holding member.

Hence, problems that may occur due to rotation of the cylindrical battery cell (for example, a situation in which the cylindrical battery cell rotates when the cylindrical battery cell is screwed to the holding member such that a desired fastening torque cannot be obtained or the like) can be avoided. As a result, a high-quality, highly reliable battery assembly can be provided.

Further, in the above constitution, the holding member of the battery assembly can be provided with a function for stopping rotation of the battery cell, and therefore other components (for example, a screw for fastening the battery cell to the holding member, accessories thereof (a washer, for example), and so on) do not have to be provided with separate rotation stopping mechanisms, enabling a reduction in the number of components, simplification of the manufacturing process, and an improvement in operating efficiency when incorporating the battery cell. As a result, manufacturing costs can be reduced, and the battery assembly can be provided at low cost.

In a preferred aspect of the battery assembly disclosed herein, the irregularities on the battery cell outer peripheral surface are formed in an asymmetrical shape relative to a radial direction central axis of the cylindrical battery cell (in other words, at least a part of an outer peripheral portion (outer peripheral surface) of the battery cell when seen from a transverse section thereof takes a randomly different shape to the other outer peripheral portions (the remainder of the outer peripheral surface). By making the irregularities on the battery cell outer peripheral surface asymmetrical in this manner, the orientations of the battery cells relative to the holding member can be aligned in a predetermined direction during assembly. Hence, an operator, for example, can assemble the respective battery cells in preset correct circumferential direction positions and orientations (for example, such that all of the constituent battery cells have the same orientation) without paying particular attention, and therefore a positioning operation can be performed easily. As a result, an improvement in operating efficiency during assembly of the battery assembly is achieved.

In a preferred aspect of the battery assembly disclosed herein, the cylindrical battery cell includes a metallic external case that accommodates an electrode body constituting a positive electrode and a negative electrode. At this time, the irregularities on the battery cell outer peripheral surface are preferably formed integrally with the external case by implementing deformation processing on an outer peripheral surface of the external case. The deformation processing may be implemented collaterally with manufacture of the external case (during drawing/ironing processing, for example), and therefore specific cost increases do not occur during manufacture of the irregularities on the battery cell outer peripheral surface.

The irregularities on the battery cell outer peripheral surface may be formed over the entire outer peripheral surface or formed selectively on the parts of the outer peripheral surface that contact the holding member (typically the surface parts that oppose the inner peripheral surface of the battery installation hole when the battery cell is inserted in the hole). Note, however, that when the irregularities are formed over the entire outer peripheral surface of the battery cell, the surface parts forming the irregularities become capable of acting as cooling fillers, leading to an improvement in the cooling efficiency of the cylindrical battery cell (and therefore the battery assembly).

BEST MODE FOR CARRYING OUT THE INVENTION

Figure 1A:
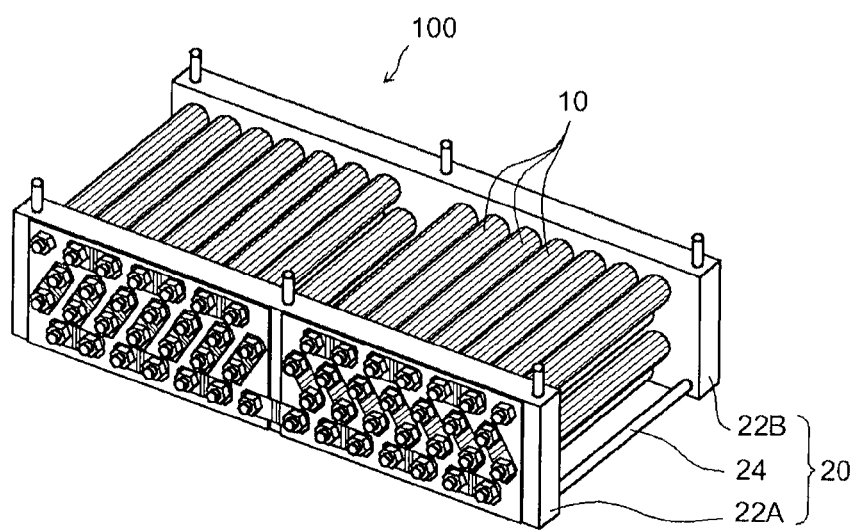
FIG. 1A is a schematic perspective view showing the constitution of a battery assembly.

A preferred embodiment of the present invention will be described below with reference to the drawings. In the following drawings, members and sites exhibiting identical actions have been allocated identical reference symbols. Note that the present invention is not limited to the following embodiment. Further, dimensional relationships (height, width, thickness, and so on) in the drawings are not intended to reflect actual dimensional relationships.

Figure 1B:
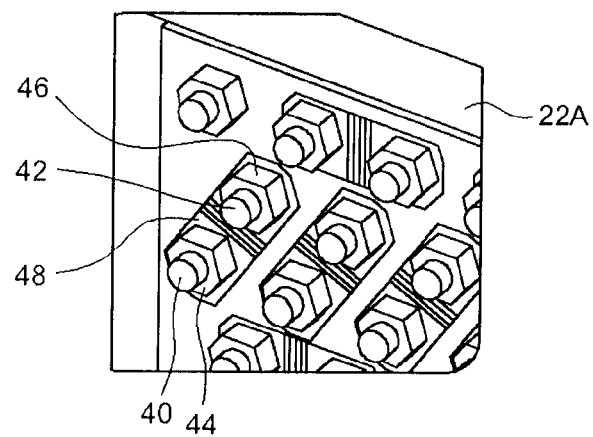
FIG. 1B is an enlarged view of the main parts of FIG. 1A.

The constitution of a battery assembly 100 according to this embodiment will now be described with reference to FIGS. 1A and 1B. FIG. 1A is a schematic perspective view showing the constitution of the battery assembly 100, and FIG. 1B is an enlarged view showing the main parts of FIG. 1A.

As shown in FIG. 1A, the battery assembly 100 is formed by electrically connecting a plurality of rechargeable/dischargeable cylindrical battery cells 10 in series. The plurality of cylindrical battery cells 10 are arranged side by side (in a zigzag pattern in the illustrated example) in a parallel attitude.

There are no particular limitations on the constitution of the cylindrical battery cell 10, and the battery cell 10 may be constituted identically to a typical cylindrical battery cell. The cylindrical battery cell 10 according to this embodiment is a lithium ion battery. A lithium ion battery is a secondary battery with which high energy density and high output can be realized, and therefore a high-performance battery assembly that is particularly suited for use as a battery assembly (battery module) installed in a vehicle can be constructed.

A positive electrode terminal 40 electrically connected to a positive terminal of a wound electrode body, to be described below, and a negative electrode terminal 42 electrically connected to a negative terminal of the wound electrode body are provided on either end of the cylindrical battery cell 10 (one end and the other end of the cylindrical battery cell in a lengthwise direction). Adjacent battery cells 10 of the plurality of battery cells 10 are inverted such that the respective positive electrode terminals 40 and negative electrode terminals 42 are disposed alternately, and the positive electrode terminal 40 of one of the adjacent battery cells 10 and the negative electrode terminal 42 of the other of the adjacent battery cells 10 are electrically connected by a conductive connecting tool 48 (a bus bar, for example). By electrically connecting the battery cells 10 in series via the conductive connecting tool 48 in this manner, the battery assembly 100 is constructed with a desired voltage.

A holding member 20 for holding the plurality of cylindrical battery cells 10 together is provided on the periphery of the cylindrical battery cells 10 arranged in this manner. The holding member 20 according to this embodiment is constituted by a pair of holding plates 22A, 22B disposed on the outside of the battery cells 10 in the lengthwise direction, and a bridging member 24 attached so as to bridge the pair of holding plates 22A, 22B.

Figure 3:
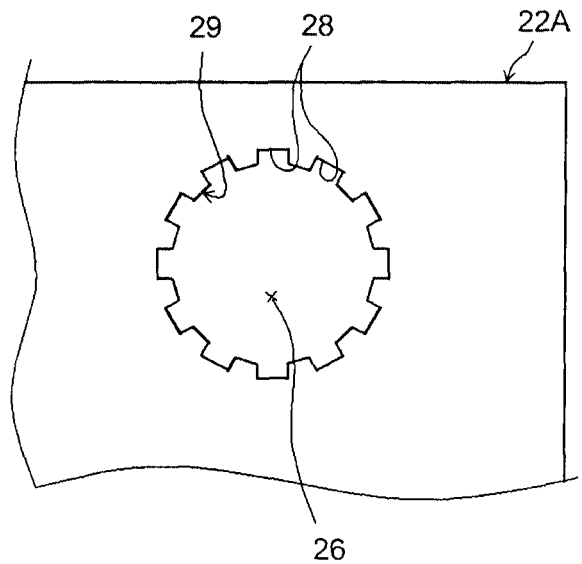
FIG. 3 is an enlarged schematic front view showing a peripheral part of a battery installation hole of a holding plate according to an embodiment.

The holding plates 22A, 22B include a plurality of battery installation holes 26 (FIG. 3). Tip end parts of the cylindrical battery cells 10 are inserted into the plurality of battery installation holes (through holes) 26 such that the positive electrode terminals 40 and negative electrode terminals 42 project to the outside from outer surfaces of the holding plates 22A, 22B. By fastening the positive electrode terminals 40 and negative electrode terminals 42 projecting from the outer surfaces of the holding plates 22A, 22B using nuts 44, 46, the cylindrical battery cells 10 can be fixed to the holding plates 22A, 22B. More specifically, the nuts 44, 46 are fitted onto tip ends of the positive electrode terminal 40 and negative electrode terminal 42, whereupon a tool such as a nut rotating driver is engaged with the nuts 44, 46 and the nuts 44, 46 are tightened by transmitting a rotary force of the tool thereto. At this time, the cylindrical battery cells 10 can be fixed to the holding plates 22A, 22B by a tightening force of the nuts 44, 46. Thus, the plurality of cylindrical battery cells 10 are respectively held inserted into the battery installation holes (through holes) 26 in the holding plates 22A, 22B.

Note that the conductive connecting tools 48 may be fixed to the holding plates 22A, 22B at the same time as the cylindrical battery cells 10 are fixed to the holding plates 22A, 22B. In other words, the nuts 44, 46 may be tightened after interposing the conductive connecting tools 48 between the holding plates 22A, 22B and the nuts 44, 46. Alternatively, other nuts may be fastened from above the nuts 44, 46 via the conductive connecting tools 48. The nuts 44, 46 of this embodiment are constituted by a metallic material, and also function as a positive electrode external terminal and a negative electrode external terminal.

Figure 2A:
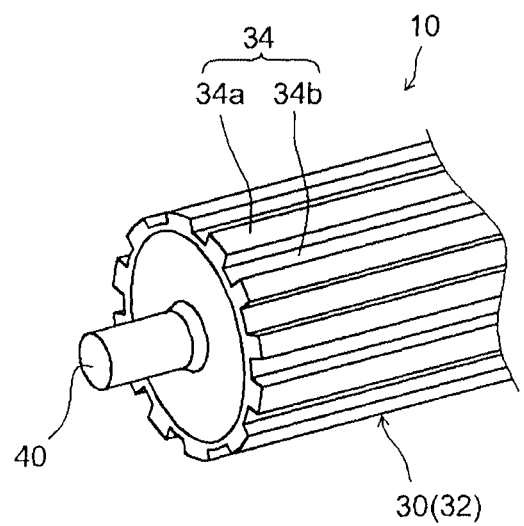
FIG. 2A is an enlarged view showing the main parts of a tip end part of a cylindrical battery cell according to an embodiment.
Figure 2B:
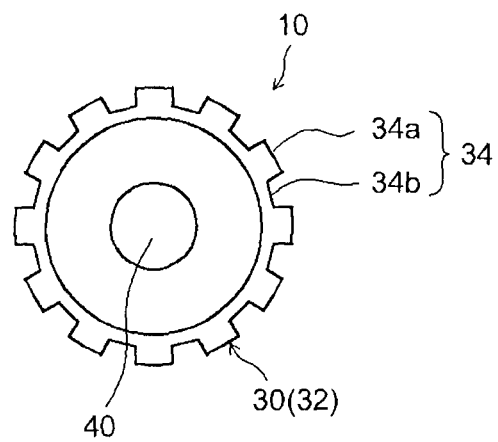
FIG. 2B is a schematic front view of FIG. 2A.
Figure 4:
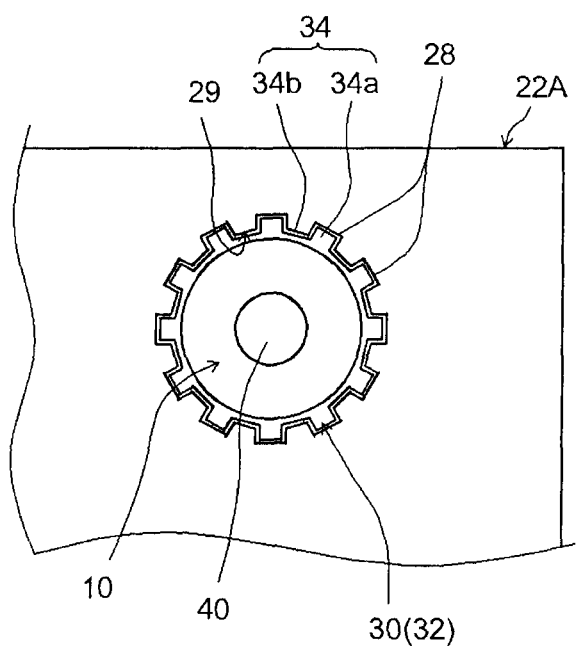
FIG. 4 is a schematic front view illustrating positional relationships between irregularities on an outer peripheral surface of the battery cell and groove portions of the battery installation hole, according to an embodiment.

The constitution of the battery assembly 100, and in particular the constitutions of the cylindrical battery cell 10 and the holding plate 22A, will now be described with reference to FIGS. 2A to 4. FIG. 2A is an enlarged view showing the main parts of the tip end part of the cylindrical battery cell 10. FIG. 2B is a schematic front view of FIG. 2A. FIG. 3 is an enlarged schematic front view showing the periphery of the battery installation hole 26 in the holding plate 22A. FIG. 4 is a schematic front view illustrating positional relationships between irregularities 34 on an external case 30 and groove portions 28 in the battery installation hole 26, in which some members (for example, the nuts 44, 46 and so on) are not shown.

As shown in FIG. 2, the cylindrical battery cell 10 includes an electrode body (not shown) having a positive electrode and a negative electrode, the external case 30, which accommo-dates the electrode body and an electrolyte, the positive electrode terminal 40 projecting to the outside from one tip end part of the external case 30, and the negative electrode terminal (not shown in FIG. 2) projecting to the outside from the other tip end part of the external case 30.

The electrode body according to this embodiment is constituted by predetermined battery constitutional materials (active material of the positive and negative electrodes, collectors of the positive and negative electrodes, a separator, and so on), similarly to a battery cell provided in a typical battery assembly. Here, a wound electrode body, to be described below, is used as the electrode body.

The external case 30 has a cylindrical shape that can accommodate the aforementioned wound electrode body. Further, the external case 30 includes irregularities 34 arranged in a circumferential direction on an outer peripheral surface 32 thereof, each of which extends in ridge form in a battery longitudinal direction. In other words, the irregularities 34 are formed on the outer peripheral surface 32 of the external case 30 such that a convex portion 34a and a concave portion 34b are connected alternately in the circumferential direction. The irregularity constituted by the convex portion 34a and the concave portion 34b according to this embodiment is a ridge-shaped (linear) irregularity extending from one end portion to the other end portion of the cylindrical battery cell 10 in the longitudinal (lengthwise) direction.

There are no particular limitations on the material of the external case 30, and an identical material to a material used in a typical battery may be employed. However, a thin metallic case may be used to reduce the weight of the battery assembly. Note that when the external case 30 is formed from a metallic material (in particular, aluminum or an aluminum alloy), the outer form of the external case 30 can be formed easily by executing drawing/ironing processing on a metal plate. In this case, the irregularities 34 can be formed integrally with the external case 30 through deformation processing.

The pair of holding plates 22A, 22B, one of which (22A) is shown in FIG. 3, include the plurality of battery installation holes (through holes) 26, each of which has groove portions 28 formed in an inner peripheral surface 29 thereof so as to mesh with the irregularities 34 (FIG. 2B) on the battery cell outer peripheral surface. In other words, the battery installation holes 26 in the holding plate 22A are formed such that an opening shape thereof is substantially identical to the irregular shape (the convex portions 34a and concave portions 34b (FIG. 2B)) on the battery cell outer peripheral surface. The groove portion 28 according to this embodiment is a linear groove extending in the lengthwise direction of the cylindrical battery cell 10.

When the cylindrical battery cell 10 is fixed to the holding plates 22A, 22B constituted as described above, the cylindrical battery cell 10 must be inserted after aligning the irregularities 34 on the battery cell outer peripheral surface with the groove portions 28 in the battery installation hole 26. More specifically, as shown in FIG. 4, the cylindrical battery cell 10 is inserted into the battery installation hole 26 while appropriately adjusting the circumferential direction orientation of the cylindrical battery cell 10 to realize a positional relationship in which the convex portions 34a of the irregularities 34 oppose the groove portions 28 of the battery installation hole 26. In the constitution described above, the irregularities 34 on the battery cell outer peripheral surface are fitted into the inner peripheral surface 29 (the groove portions 28) of the battery installation hole 26 when the cylindrical battery cell 10 is inserted into the battery installation hole, and therefore the cylindrical battery cell 10 can be prevented from rotating relative to the holding plate 22A (i.e. rotating in the circumferential direction of the cylindrical battery cell 10).

Hence, when fixing the cylindrical battery cells 10 to the holding plates 22A, 22B via the nuts 44, 46, it is possible to avoid a situation in which the cylindrical battery cell 10 rotates such that a desired fastening torque cannot be obtained, for example. Alternatively, when attaching the conductive connecting tools 48 provided between the respective battery cells to the cylindrical battery cells 10 via the nuts 44, 46, a situation in which the cylindrical battery cell rotates so as to damage the conductive connecting tool 48 can be avoided. As a result, a high-quality, highly reliable battery assembly can be provided.

Furthermore, with the above constitution, the holding plates 22A, 22B of the battery assembly 100 can be provided with a function for stopping battery cell rotation, and therefore other components (for example, the nuts 44, 46 for fastening the battery cells 10 to the holding plates 22A, 22B, accessories thereof (a washer, for example), and so on) do not have to be provided with separate rotation stopping mechanisms, enabling a reduction in the number of components and simplification of the manufacturing process. Hence, an improvement in operating efficiency and a reduction in manufacturing cost can be realized, and as a result, the battery assembly can be provided at low cost.

Furthermore, in this embodiment, the irregularities 34 on the battery cell outer peripheral surface are formed integrally with the metallic external case 30 by implementing deformation processing on the outer peripheral surface of the external case 30. This deformation processing may be implemented collaterally with manufacture of the external case 30 (during the drawing/ironing processing, for example), and therefore specific cost increases do not occur during manufacture of the irregularities 34.

As an example of the dimensions of the linearly formed irregularity 34, the width of the convex portion 34a may be set at approximately 0.5 mm to 5.0 mm, the width of the concave portion 34b may be set at approximately 0.5 mm to 5.0 mm, and the depth may be set at approximately 0.2 mm to 3.0 mm. However, the dimensions of these irregular shapes may be modified appropriately in accordance with the specifications, application, use conditions, and so on of the battery assembly 100. Further, the battery cell outer peripheral surface may be formed with a single irregularity 34 or between two and ten irregularities 34 provided repetitively. However, a plurality of the irregularities 34 are preferably formed repetitively over the entire outer peripheral surface of the battery cell, as in this embodiment. When the irregularities 34 are provided in a plurality, the engagement between the irregularities 34 on the battery cell outer peripheral surface and the groove portions 28 in the battery installation hole is stronger, and therefore circumferential direction rotation of the cylindrical battery cell 10 can be prevented reliably.

As long as the irregularities 34 on the battery cell outer peripheral surface are formed on the outer peripheral surface of a part (typically the end parts in the longitudinal direction, as in this embodiment) of the battery cell that contacts the inner peripheral surface of the battery installation hole 26 when the cylindrical battery cell 10 is inserted into the battery installation hole 26, the irregularities 34 may be provided over the entire outer peripheral surface of the battery cell or formed selectively on the two end parts of the battery cell. Note, however, that when the irregularities are formed over the entire outer peripheral surface of the battery cell, the irregularities become capable of acting as cooling fillers, leading to an improvement in the cooling efficiency of the cylindrical battery cell (and therefore the battery assembly).

Next, referring to FIGS. 5A to 7, another embodiment of the present invention will be described. A battery assembly according to this embodiment differs from the battery assembly 100 described above in that the irregularities 34 on the battery cell outer peripheral surface are formed in an asymmetrical shape. Identical constitutional members to those of the battery assembly 100 have been allocated identical reference symbols, and duplicate description thereof has been omitted.

Figure 5A:
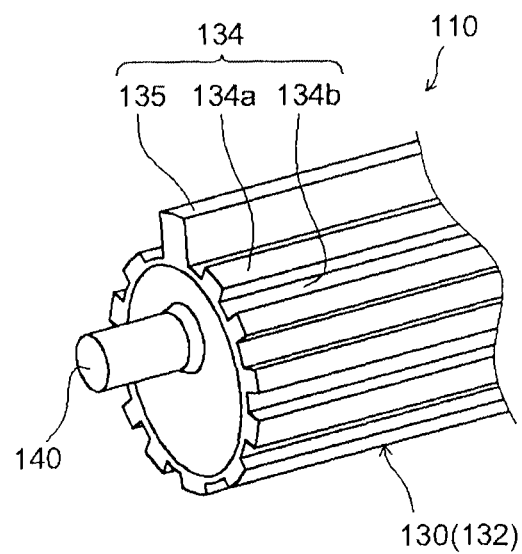
FIG. 5A is an enlarged view showing the main parts of a tip end part of a cylindrical battery cell according to an embodiment.
Figure 5B:
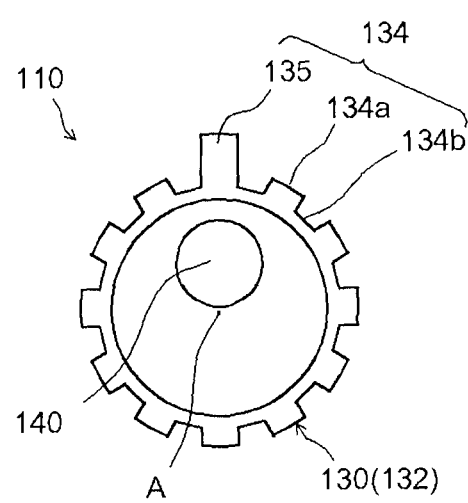
FIG. 5B is a schematic front view of FIG. 5A.
Figure 6:
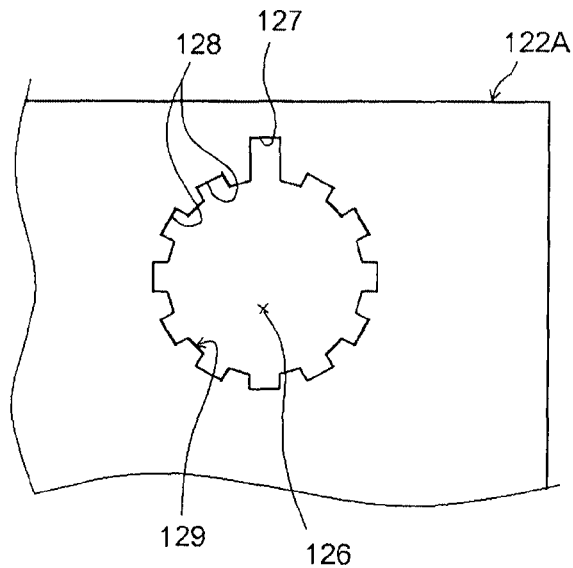
FIG. 6 is an enlarged schematic front view showing a peripheral part of a battery installation hole of a holding plate according to an embodiment.

As shown in FIGS. 5A and 5B, irregularities 134 formed on an outer peripheral surface 132 of an external case 130 of a battery cell 110 according to this embodiment include a single projecting convex portion 135 which is randomly taller (i.e. projects outward in a radial direction) than other convex portions 134a. Therefore, the irregularities 134 take an asymmetrical shape relative to a radial direction central axis A of the cylindrical battery cell 110 (i.e. in a battery transverse section). Meanwhile, as shown in FIG. 6, a single deep groove portion 127 having a greater groove depth than other groove portions 128 is formed in an inner peripheral surface 129 of a battery installation hole 126 of a holding plate 122A to mesh with the asymmetrical irregularities 134 described above (FIG. 5B).

Figure 7:
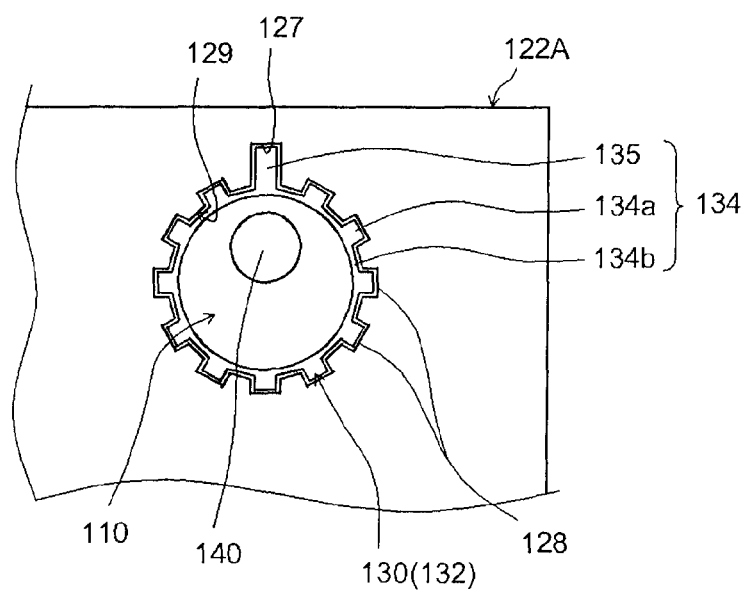
FIG. 7 is a schematic front view illustrating positional relationships between irregularities on an outer peripheral surface of the battery cell and groove portions of the battery installation hole, according to an embodiment.

When the cylindrical battery cell 110 is fixed to the holding plate 122A constituted as described above, the cylindrical battery cell 110 must be inserted after specifically aligning the projecting convex portion 135 of the irregularities 134 and the deep groove portion 127 in the inner peripheral surface 129 of the battery installation hole 126. More specifically, as shown in FIG. 7, the cylindrical battery cell 110 is inserted into the battery installation hole 126 of the holding plate 122A while appropriately adjusting the circumferential direction orientation of the cylindrical battery cell 110 to realize a positional relationship in which the projecting convex portion 135 opposes the deep groove portion 127 of the battery installation hole 126.

By making the irregularities 134 on the outer peripheral surface 132 of the battery cell external case 130 asymmetrical in this manner, the respective orientations of the battery cells 110 relative to the holding plate 122A can be aligned in a single direction during assembly. This constitution is particularly useful when a formation position of a positive electrode terminal 140 is offset from the radial direction central axis A of the cylindrical battery cell 110 (in other words, when particular attention must be paid to the orientations of the batteries during installation), as shown in FIG. 5. More specifically, when the formation position of the positive electrode terminal 140 is offset from the center, the directions in which the battery cells 110 are attached to the holding plate 122A must be aligned in a single direction, but with the constitution described above, an operator, for example, can assemble the respective battery cells 110 in identical circumferential direction positions without paying particular attention, and therefore a positioning operation can be performed easily. As a result, an improvement in operating efficiency during assembly of the battery assembly is achieved.

Note that as long as the irregularities on the battery cell outer peripheral surface are asymmetrical, the orientations of the respective battery cells 110 relative to the holding plate 122A can be aligned uniformly, and therefore the irregularities 134 are not limited to the shape described above. For example, instead of providing a tall projecting convex portion to achieve asymmetry, asymmetry may be achieved by forming a convex portion (an irregularly shaped portion) having a different cross-sectional shape to the other convex portions.

Note that in the above examples, the constitution of the positive electrode side of the battery cell was described mainly, but the constitution of the negative electrode side is similar.

Next, the constitutions of the cylindrical battery cells 10, 110 used in the above embodiments, constitutional materials of the battery cells 10, 110, and so on will be described in detail. The battery assembly 100 according to this embodiment uses rechargeable/dischargeable secondary batteries as the battery cells 10, 110, and as long as the battery assembly 100 is formed by connecting a plurality of the battery cells 10, 110 in series, there are no particular limitations on the constitution of the battery cell 10, 110. The type of the battery cell is not limited to the aforementioned lithium ion battery, and a nickel hydrogen battery, an electric double layer capacitor, and so on may be applied favorably as the battery cell of the present invention.

Further, as described above, the cylindrical battery cell 10, 110 includes an electrode body having a positive electrode and a negative electrode, and the external case 30, 130 accommodating the electrode body and an electrolyte. The constitution of a wound electrode body accommodated in the external case 30, 130 will now be described in detail. The wound electrode body according to this embodiment is formed by laminating a sheet-form positive electrode (to be referred to hereafter as a "positive electrode sheet") and a sheet-form negative electrode (to be referred to hereafter as a "negative electrode sheet") together with two sheet-form separators (to be referred to hereafter as "separator sheets"), and then winding the positive electrode sheet and negative electrode sheet at a slight offset from each other, similarly to a normal wound electrode body for a lithium ion battery.

By winding the wound electrode body at a slight offset in a lateral direction relative to a winding direction, as described above, parts of the respective ends of the positive electrode sheet and negative electrode sheet protrude outward from respective winding core parts (in other words, a part in which a positive electrode active material layer formation part of the positive electrode sheet, a negative electrode active material layer formation part of the negative electrode sheet, and the separator sheet are wound tightly). A positive electrode lead terminal and a negative electrode lead terminal are respectively annexed to the positive electrode side protruding part (i.e. a part in which the positive electrode active material layer is not formed) and the negative electrode side protruding part (i.e. a part in which the negative electrode active material layer is not formed), and the positive electrode lead terminal and negative electrode lead terminal are electrically connected to the positive electrode terminal 40 and the negative electrode terminal 42, respectively.

There are no particular limitations on the materials and members constituting the wound electrode body, and similar materials and members to those of a conventional electrode body for a lithium ion battery may be used. For example, the positive electrode sheet may be formed by applying a positive electrode active material layer for a lithium ion battery to an elongated positive electrode collector. Aluminum foil (used in this embodiment) or another metal foil suitable for use as a positive electrode is preferably used as the positive electrode collector. There are no particular limitations on the material used as the positive electrode active material, and one or more types of a material used conventionally in a lithium ion battery may be employed. Preferred examples thereof include $LiMn_2O_4$, $LiCoO_2$, and $LiNiO_2$. For example, a favorable positive electrode sheet is obtained by employing aluminum foil having a length of 2 to 10 m, a width of 8 to 30 cm, and a thickness of 5 to 20 μm (15 μm, for example) as the collector and forming a positive electrode active material layer for a lithium ion battery having lithium nickel oxide as a main constituent (for example, 88% by weight of lithium nickel oxide, 10% by weight of acetylene black, 1% by weight of polytetrafluoroethylene, and 1% by weight of carboxymethyl cellulose) in a predetermined region of a front surface of the collector using a normal method.

Meanwhile, the negative electrode sheet may be formed by applying a negative electrode active material layer for a lithium ion battery to an elongated negative electrode collector. Copper foil (used in this embodiment) or another metal foil suitable for use as a negative electrode is preferably used as the negative electrode collector. There are no particular limitations on the material used as the negative electrode active material, and one or more types of a material used conventionally in a lithium ion battery may be employed. Preferred examples thereof include a carbon-based material such as graphite carbon or amorphous carbon, and a lithium-containing transition metal oxide or transition metal nitride. For example, a favorable negative electrode sheet is obtained by employing copper foil having a length of 2 to 10 m, a width of 8 to 30 cm, and a thickness of 5 to 20 μm (10 μm, for example) and forming a negative electrode active material layer for a lithium ion battery having graphite as a main constituent (for example, 98% by weight of graphite, 1% by weight of styrene butadiene rubber, and 1% by weight of carboxymethyl cellulose) in a predetermined region of a front surface of the copper foil using a normal method.

Further, a porous polyolefin-based resin may be used favorably as the separator sheet provided between the positive and negative electrode sheets. For example, a porous separator sheet made of synthetic resin (for example, a polyolefin such as polyethylene) and having a length of 2 to 10 m, a width of 8 to 30 cm, and a thickness of 5 to 30 μm (25 μm, for example) can be used favorably. Note that when a solid electrolyte or a gel-form electrolyte is used as the electrolyte, the separator may not be required (in such cases, the electrolyte itself functions as a separator).

Next, the constitution of the electrolyte accommodated in the external case 30, 130 together with the above wound electrode body will be described. The electrolyte according to this embodiment is a lithium salt such as $LiPF_6$, for example. In this embodiment, an appropriate amount (concentration 1M, for example) of a lithium salt such as $LiPF_6$ is dissolved in a non-aqueous electrolyte solution such as a mixed solvent of diethyl carbonate and ethylene carbonate (mass ratio 1:1, for example) and used as an electrolyte solution.

The cylindrical battery cell 10, 110 of this embodiment is constructed by accommodating the wound electrode body in the external case 30, 130, injecting the electrolyte solution described above, and then sealing the external case 30, 130. The battery cells 10, 110 are then arranged in a predetermined direction (in parallel in this embodiment) and fixed by the holding member 20, whereupon the holding member 20 is accommodated in another accommodating case (not shown). Thus, the battery assembly 100 of this embodiment is constructed.

The present invention was described above using preferred embodiments, but the above description is not limited matter, and may be subjected to various modifications. For example, when the battery assembly of the present invention is installed in a vehicle such as an automobile, a larger number of battery cells may be connected in series, and an external cover for protecting the main parts (the battery cell group and so on) of the battery assembly, a component for fixing the battery assembly in a predetermined site of the vehicle, a component for connecting a plurality of battery assemblies to each other (to form a battery module), and so on may be attached thereto. However, these attachments do not determine the technical scope of the present invention.

INDUSTRIAL APPLICABILITY

According to the present invention, a battery assembly structured to prevent unintentional rotation when a cylindrical battery cell is incorporated into a holding member and improve the efficiency of an assembly operation can be provided.

Figure 8:
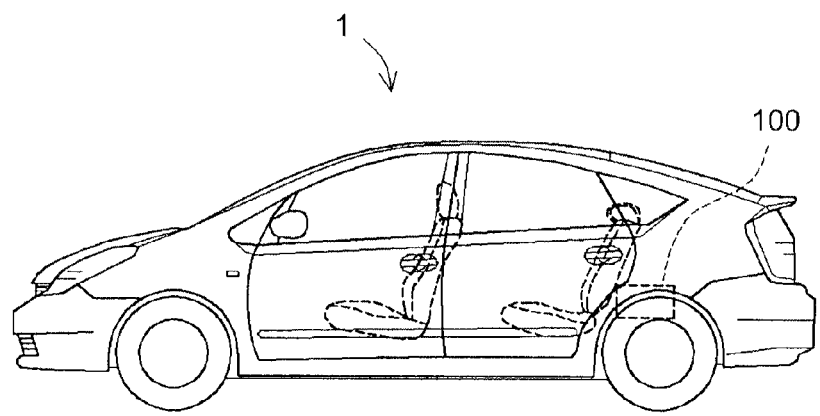
FIG. 8 is a schematic side view showing a vehicle (an automobile) including the battery assembly according to the present invention.

Further, the battery assembly 100 disclosed herein can be used particularly favorably as a power supply for a motor (electric motor) installed in a vehicle such as an automobile. Hence, with the present invention, as shown schematically in FIG. 8, a vehicle (typically an automobile, in particular an automobile having an electric motor, such as a hybrid automobile, an electric automobile, or a fuel cell automobile) 1 having the battery assembly 100 disclosed herein as a power supply can be provided.

The invention claimed is:

1. A battery assembly, comprising:
a plurality of rechargeable/dischargeable cylindrical battery cells; and
a holding member for holding said plurality of cylindrical battery cells,
wherein an outer peripheral surface of each of said cylindrical battery cells is formed with irregularities that are arranged in a circumferential direction of each of said cylindrical battery cells and extend in a ridge form in a battery longitudinal direction;
wherein the holding member has a pair of holding plates disposed on an outside of the battery cells;
wherein said holding plates include a plurality of battery installation holes, each of which has groove portions formed in an inner peripheral surface thereof such that said groove portions are substantially identical to the irregularities formed on said battery cell outer peripheral surface;
wherein each of said plurality of cylindrical battery cells is held inserted into said battery installation holes in said holding plates such that in this state, said irregularities on said battery cell outer peripheral surface and said groove portions in said battery installation holes are fitted to each other, thereby preventing each of said plurality of cylindrical battery cells from rotating relative to said holding plates;
wherein nuts are fitted onto tip end parts of each of said plurality of cylindrical battery cells; and
wherein each of said plurality of cylindrical battery cells is fixed to the holding plates by a tightening force of the nuts.

2. The battery assembly according to claim 1, wherein said irregularities on said battery cell outer peripheral surface are formed in an asymmetrical shape relative to a radial direction of a central axis of each of said cylindrical battery cells.

3. The battery assembly according to claim 1, wherein each of said cylindrical battery cells includes a metallic external case that accommodates an electrode body constituting a positive electrode and a negative electrode, and
said irregularities on said battery cell outer peripheral surface are formed integrally with said external case by implementing deformation processing on an outer peripheral surface of said external case.

4. The battery assembly according to claim 1, wherein said irregularities on said battery cell outer peripheral surface are formed over the entire outer peripheral surface of each of said cylindrical battery cells.

5. A vehicle, comprising the battery assembly according to claim 1.

6. A vehicle, comprising the battery assembly according to claim 2.

7. The battery assembly according to claim 1, wherein the pair of holding plates are disposed on the outside of the battery cells in a lengthwise direction.

8. The battery assembly according to claim 1, wherein the irregularities formed on the outer peripheral surface of each of said cylindrical battery cells include a projecting convex portion which is taller than other convex portions.

* * * * *